(12) United States Patent
Reddy et al.

(10) Patent No.: US 7,454,021 B2
(45) Date of Patent: Nov. 18, 2008

(54) OFF-LOADING DATA RE-ENCRYPTION IN ENCRYPTED DATA MANAGEMENT SYSTEMS

(75) Inventors: Prakash Reddy, Fremont, CA (US); James Rowson, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 930 days.

(21) Appl. No.: 10/976,552

(22) Filed: Oct. 29, 2004

(65) Prior Publication Data

US 2006/0093150 A1 May 4, 2006

(51) Int. Cl.
*H04L 29/00* (2006.01)
(52) U.S. Cl. .......................... 380/282; 380/28; 380/30; 380/45; 380/281; 380/283; 380/284; 380/285; 380/286
(58) Field of Classification Search ................... 380/28, 380/30, 281–286, 45
See application file for complete search history.

(56) References Cited

U.S. PATENT DOCUMENTS

| | | | | |
|---|---|---|---|---|
| 591,399 | A | * 10/1897 | Hallock | ........................ 278/84 |
| 5,937,066 | A | * 8/1999 | Gennaro et al. | ............. 380/286 |
| 6,118,873 | A | * 9/2000 | Lotspiech et al. | ........... 380/277 |
| 7,305,711 | B2 | * 12/2007 | Ellison et al. | ................ 726/29 |
| 2002/0104001 | A1 | * 8/2002 | Lotspiech et al. | ........... 713/163 |
| 2002/0118838 | A1 | * 8/2002 | Belenko et al. | ............. 380/277 |

FOREIGN PATENT DOCUMENTS

WO WO 02060118 A2 * 8/2002

OTHER PUBLICATIONS

RSA Laboratories's Frequently Asked Questions About Today's Cryptography, 2000, Version 4.1, 4.1.3.7.*

* cited by examiner

*Primary Examiner*—Kambiz Zand
*Assistant Examiner*—Tongoc Tran (57) ABSTRACT

Described is a solution for maintaining the security of encrypted data despite a compromised private key by using a re-encryption process that does not require decryption of the encrypted data. The compromised private key is re-encrypted using a new public key as is the encrypted symmetric key which the compromised private key can decrypt. When a decrypted version of the encrypted data is requested, the private key corresponding to the new public key decrypts both the encrypted version of the compromised private key and the re-encrypted version of the symmetric key resulting in the unencrypted compromised private key and the previously encrypted version of the symmetric key, which when decrypted using the compromised private key decrypts the encrypted data. The unencrypted symmetric key can then be encrypted using the new public key any encrypted compromised private key can be deleted.

30 Claims, 5 Drawing Sheets

OFF-LOADING DATA RE-ENCRYPTION IN ENCRYPTED DATA MANAGEMENT SYSTEMS

BACKGROUND

Field of the Invention

The invention generally relates to data security systems using encryption.

Encrypted data management systems are designed to protect data by applying cryptography to encrypt the data before storing it persistently. Data can be decrypted by entities that possess the decryption key. Encrypted data management systems typically use public-key encryption (PKI) in conjunction with symmetric key encryption to encrypt data. In symmetric key cryptography, there is one key, sometimes referred to as the secret key, which both the sender and recipient of an encrypted message possess. The secret key can be used to both encrypt and decrypt the encrypted message typically using a standard encryption algorithm such as Data Encryption Standard (DES), triple DES, International Data Encryption Algorithm (IDEA), and RC4. Secure distribution of the secret key must be addressed and is not particularly feasible in contexts such as a one time Internet transaction with an unknown party. Public-key encryption, which is also referred to as asymmetric key cryptography, addresses the secure distribution problem with an asymmetric key pair of a private key and a public key. Software using a complex asymmetric key technology such as the Diffie-Hellman algorithm, generates the public key from the private key. The public key is published while the private key is not shared or transmitted in order to keep it private. Any message encrypted with a given public key can only be decrypted using the corresponding private key. While providing a high level of security, asymmetric key cryptography consumes system resources; hence a combined approach is used in which each data unit is encrypted symmetrically using a unique symmetric key, but for communication of the encrypted data, public-key encryption (PKI) is used. The following example of User A sending an encrypted data unit, for example an e-mail message, to User B illustrates a combined approach. User A encrypts the data unit according to an encryption algorithm using a symmetric key resulting in an encrypted data unit: E(symmetric key, data)=>Encrypted Data. User A encrypts the symmetric key according to an asymmetric encryption algorithm using a public key published by User B: E(User B's public key, symmetric key)=>Encrypted Symmetric Key. Both the Encrypted Data and the Encrypted Symmetric Key is sent via a network, for example the Internet, to User B. At user B's computer, software decrypts the Encrypted Symmetric Key using User B's private key corresponding to User B's public key: D(User B's private key, Encrypted Symmetric Key)=>symmetric key. Software then decrypts the Encrypted Data using the symmetric key so that the data can be read: D(symmetric key, Encrypted Data)=>data. This standard technique requires careful management of the asymmetric private key because this private key decrypts any data such as the symmetric key that has been previously encrypted with its corresponding public key.

The public/private key pair typically needs to be updated periodically for one or more reasons, some examples of which are as follows: a) the keys have expiration times, b) the private key has been compromised, c) or the owner of the key pair has left the organization. Several techniques have been proposed on how to handle the key update problem. One technique is that described in "Step-by-Step Guide to Encrypting File System (EFS)," Content updated Sep. 2, 2003 retrieved from the Internet: http://www.microsoft.com/windows2000/techinfo/planning/security/efssteps.asp. In addition to a user's public/private key pair, there is another asymmetric key pair for each file, a randomly generated file encryption key used to encrypt the file and a corresponding public recovery key from which a recovery agent determines the file encryption key which it uses to decrypt the file. This additional asymmetric pair is particularly useful in the situation in which an employee leaves the company. However, the user's public/private key pair can still also decrypt the data, so the file once decrypted must be re-encrypted. Other systems provide encryption key pair updates in which both new public keys and new private keys are generated thus requiring the re-encryption of data for a new symmetric key to be encrypted with the new private key to ensure security. Some data security systems also maintain a history of the decryption private keys and their corresponding public keys for a user so that if any of these are used by a user, the user can access the data. However, for each key pair generated, the data must be first decrypted and then re-encrypted to generate the new symmetric key to be encrypted by a new private key.

When keys are compromised, these solutions still require that all of the data that has been previously encrypted for another key pair needs to be decrypted and re-encrypted with another symmetric key to be encrypted using the new private key. These solutions work but are time and resource consuming. Additionally, consider the situation in which data storage is handled by an external storage provider. In such a situation, accessing all of the data, downloading it from the storage server, decrypting it, re-encrypting it for the new private key and storing it back can take up quite a bit of resources (time, bandwidth, storage, computation power, etc.) Furthermore, storage providers typically guarantee to protect the data against damages or loss, but do not guarantee to protect the secrecy of the data. When un-trusted storage service providers are used, the resources required can be even more as some of the data stored offline cannot be re-encrypted with the current solution unless the data is brought on line.

It is desirable to provide a solution that preserves data security when an encryption key pair has been compromised while reducing resource requirements for re-encryption of the data with a new key pair.

SUMMARY OF THE INVENTION

The present invention provides one or more embodiments of solutions for maintaining the security of data encrypted with a symmetric key despite a private key for decrypting an encrypted version of the symmetric key being compromised without requiring the decryption of the encrypted data as part of the re-encryption process.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that other embodiments of the structures and methods illustrated herein may be employed without departing from the principles of the invention described herein.

DETAILED DESCRIPTION

Figure 1:
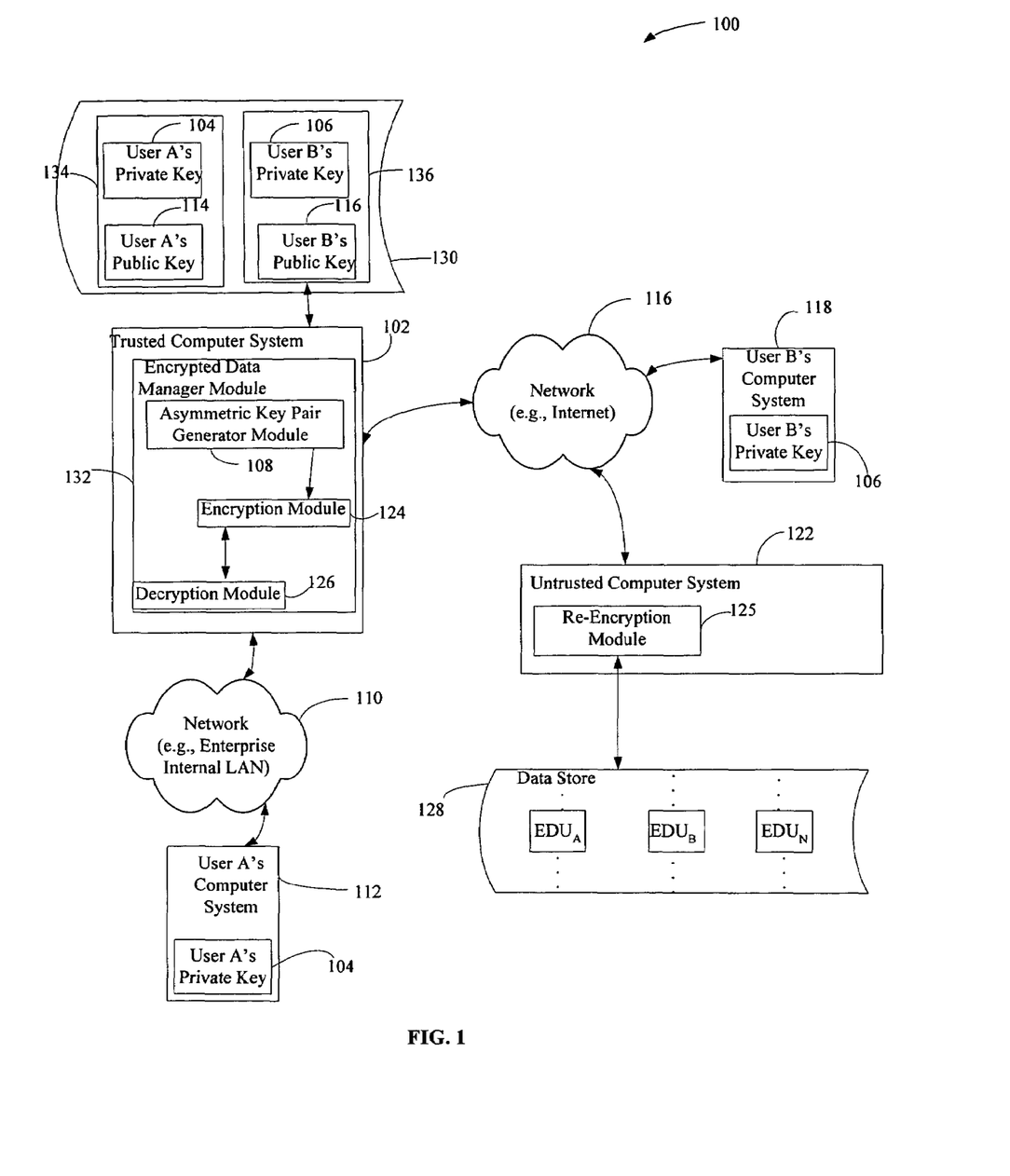
FIG. 1 is a functional block diagram of a computer-implemented system for maintaining security of an encrypted data unit despite a compromised private key in accordance with an embodiment of the present invention.

FIG. 1 is a functional block diagram of a computer-implemented system for maintaining security of an encrypted data unit despite a compromised private key in accordance with an embodiment of the present invention. For purposes of the discussion below, each of the encrypted data units, (e.g., $EDU_N$), is encrypted symmetrically, and the symmetric key is further encrypted with a public key of an asymmetric pair. As discussed below, the system embodiment 100 performs re-encryption on a small subset of the data of the encrypted data unit, its meta-data, thus off-loading decryption and re-encryption of the content data until the encrypted data unit is requested or at a time determined by the data owner or controller. An example of such a time is off-hours when more computing resources are available. Performing the re-encryption on a per data unit independently of other data units draws less computing resources at one time and also allows for distributed control of the re-encryption process.

FIG. 1 is an example of a system embodiment of the present invention in which an encrypted data unit $EDU_B$ associated with a compromised private key is archived on an untrusted computer system 122 under the control of an external storage provider. The system embodiment 100 comprises a trusted computer system 102 which is communicatively coupled to a plurality of computer systems including User A's computer system 112, via a network 10, for example an enterprise's internal local area network (LAN) and to User B's computer system 118 and an untrusted computer system 122 via a network 116, in this example the Internet. A computer system 102, 112, 118, 122 typically includes a processor, memory (some examples of which are read only memory (ROM), random access memory (RAM), or flash memory, etc.) and software stored in memory such as an operating system and applications. In the case of encrypted data management systems and external storage providers, the trusted 102 and untrusted 122 computer systems are typically servers. For purposes of this discussion, the untrusted computer system 122 is trusted with certain functions commonly entrusted to external storage providers or for which they will commonly accept responsibility. Some examples of these functions are managing data against disasters (e.g., machine failures, natural disasters earthquake, floods, fire etc.) and applying well-defined operations on the data. The untrusted computer system 122 is not trusted to protect the data content (e.g., from employees or hackers); hence, it does not have access to keys which can be used to decrypt data directly or indirectly. The trusted computer system 102 provides access to keys, both asymmetric and symmetric, used for encryption and decryption. Furthermore, the trusted computer system 102 controls encryption data management through modules (e.g., 108, 124, 126, 132) for generating new keys, both asymmetric and symmetric, for instructing the untrusted computer system 122 to re-encrypt the previously encrypted symmetric key, for encrypting and decrypting data, encrypting a compromised private key, and for disassociating any compromised private key from a data unit after its symmetric key has been re-encrypted with a new public key.

The trusted computer system 102 comprises an encrypted data manager module 132 which includes an asymmetric key pair generator module 108, an encryption module 124, and a decryption module 126. The trusted system 102 provides access for the modules 132, 108, 124, 126 to a storage module 130 storing a copy of an asymmetric key pair 134 for User A including a private key 104 and a public key 114 as well as an asymmetric pair 136 for User B including a private key 106 and a public key 116. The encrypted data manager module 132 determines whether a key has been compromised and initiates an appropriate process to maintain security of the encrypted data associated with the compromised key. Responsive to a request from the encrypted data manager module 132, the asymmetric key pair generator 108 generates a new asymmetric pair and stores the new pair in the accessible storage module 130. Such a request can be generated responsive to detection of a compromised private key. The encryption module 124 can perform both symmetric and asymmetric key encryption algorithms. In the case of a compromised private key which can decrypt an encrypted version of a symmetric key of an encrypted data unit, either the data manager module 132 or the asymmetric key pair generator module 108 can request the encryption module 124 to encrypt the compromised private key using the public key of the pair generated due to the detection of the compromised key. The decryption module 126 can perform both symmetric and asymmetric decryption algorithms.

For illustrative purposes, the discussion of the system embodiment 100 proceeds in the context of a scenario in which User A's private key has not been compromised, but User B's private key has been compromised.

In this embodiment, the untrusted computer system 122 of the external storage service provider is trusted to execute a re-encryption process. In the embodiment 100 of FIG. 1, the re-encryption task is off-loaded to the untrusted computer system 122 as none of the given information of the newly generated public key or the encrypted compromised private key enables the untrusted system 122 to decrypt the encrypted symmetric key. The encrypted data manager 132 sends the new public key and the encrypted compromised private key produced by the encryption module 124 to the re-encryption module 125. In one example, to ensure that only authorized parties can request the untrusted computer system 122 to execute a re-encryption process, the encrypted data manager module 132 also sends authentication credentials with these keys which the untrusted computer system 122 or other computer system within the service provider's network verifies.

The untrusted computer system 122 comprises a re-encryption module 125 and is accessible to a data-store 128 of archived data including an encrypted data unit associated with User A's private key $EDU_A$, and an encrypted data unit $EDU_B$ associated with a compromised private key of User B among others e.g., $EDU_N$. Each encrypted data unit has meta-data associated with its content data. An example of an encrypted data unit is a file which has meta-data associated with the content data it contains, for example, a document. The re-encryption module 125 receives the new public key and the encrypted compromised private key and retrieves the meta-data of each of the encrypted data units (e.g., $EDU_B$) including an encrypted symmetric key that can be decrypted by the compromised private key. Upon retrieval of the requested meta-data, the re-encryption module 125 re-encrypts the previously encrypted version of the symmetric key using the new public key 116 for User B and replaces the previously encrypted version with the re-encrypted symmetric key in the meta-data. The encrypted compromised private key is also stored in the meta-data for the encrypted data unit $EDU_B$. Thus, the content data of the encrypted data unit $EDU_B$ is secure again without decryption of its content data. Furthermore, the system embodiment 100 in FIG. 1 provides for the elimination of the need to transfer all the data of the effected encrypted data unit(s), e.g., $EDU_B$, from the untrusted server at one time and perform decryption online of all of the effected data for re-encryption thus easing computing and data storage resource requirements.

Upon receiving a request for the encrypted data unit $EDU_B$, for example from User B's computer, the decryption module 126 executing on the trusted computer system 102 receives $EDU_B$ from the untrusted computer system 122 and decrypts both the encrypted symmetric key and the encrypted compromised private key using the latest version of the private key 106 of the generated asymmetric key pair 136 for User B resulting in the previously encrypted symmetric key and the unencrypted compromised private key. The decryption module 126 applies a decryption algorithm using the compromised private key which results in an unencrypted symmetric key which the module 126 uses to decrypt the data. Once decrypted, the decryption module 126 or the data manager module 132 can request the encryption module 124 to generate a new symmetric key which the encryption module 124 uses to encrypt the data. The encryption module 124 encrypts the new symmetric key with User B's public key 116. The encryption module 124 can also delete any encrypted compromised private key from the meta-data of $EDU_B$. Upon receipt of the $EDU_B$, User B's computer system 118 can decrypt the encrypted symmetric key using its copy of the latest version of User B's private key 106 and uses this unencrypted symmetric key to decrypt $EDU_B$.

In another embodiment, the meta-data for encrypted data units can be stored separately in a storage unit accessible only by the trusted computer system 102 and the encryption module 124 can perform re-encryption of the previously encrypted symmetric key on the trusted computer system 102.

In another embodiment, the encrypted data and their associated meta-data are stored within the enterprise's trusted network and the encryption module 124 or a combination of encryption and re-encryption modules (124 and 125) can perform the encryption of the compromised private key and the previously encrypted symmetric key using the new public key.

In another embodiment, control of encrypted data management is distributed among computer systems within a network. For example, each of User A's computer system 112 and User B's computer system 118 can include modules such as an encrypted data manager module 132, an asymmetric key pair generator module 108, an encryption module 124 and a decryption module 126 and can communicate directly with the re-encryption module 125 on the untrusted computer system 122.

Each of the modules illustrated in FIG. 1 or a portion thereof can be implemented in software suitable for execution on a processor and storage in a computer-usable medium, hardware, firmware or any combination of these. Computer-usable media include any configuration capable of storing programming, data, or other digital information. Examples of computer-usable media include various memory embodiments such as random access memory and read only memory, which can be fixed in a variety of forms, some examples of which are a hard disk, a disk, flash memory, or a memory stick.

Figure 2A:
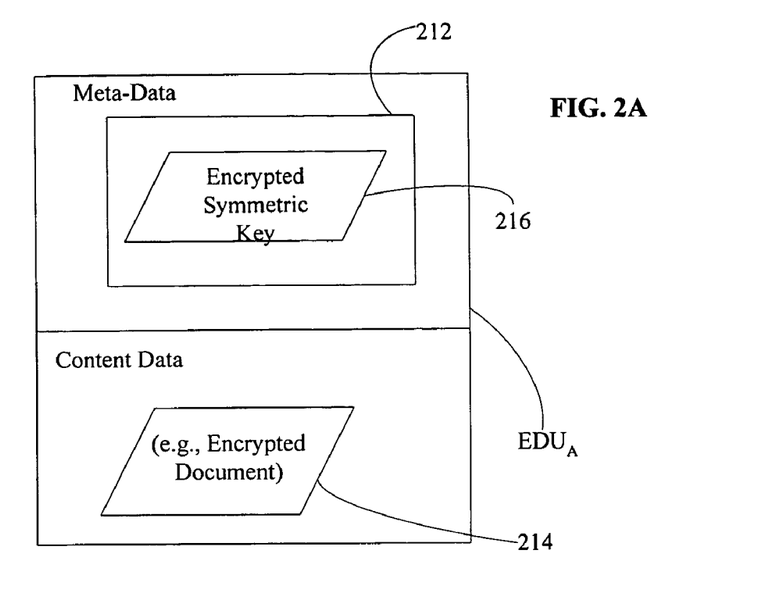
FIG. 2A is a block diagram illustrating a structure of an encrypted data unit including meta-data storing an encrypted symmetric key that can be used by and/or produced from one or more embodiments of the present invention.
Figure 2B:
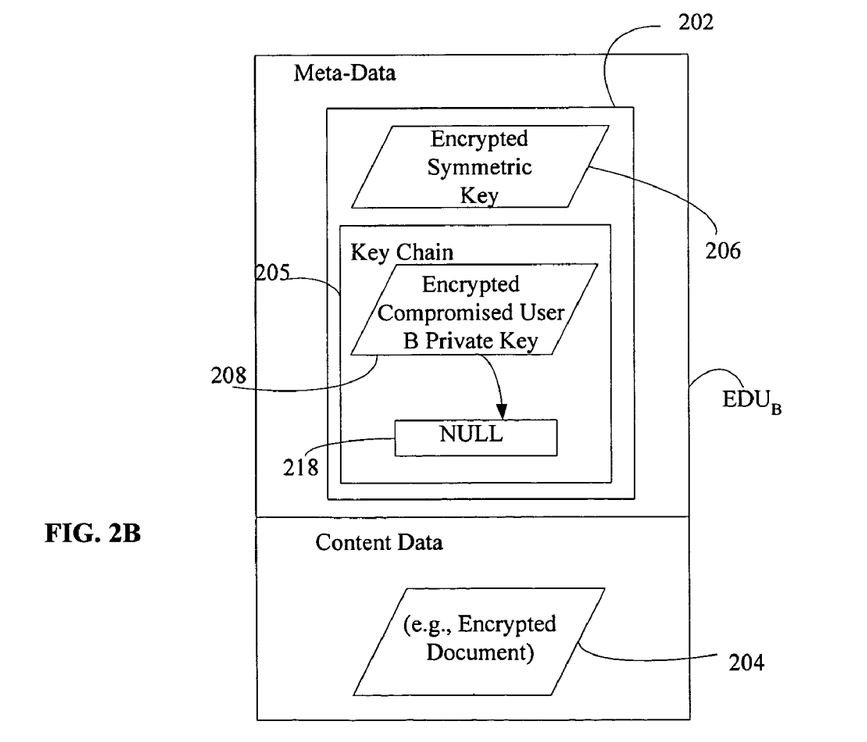
FIG. 2B is a block diagram illustrating an encrypted data unit associated with a compromised private key including meta-data storing an encrypted compromised private key chain data structure that can be used in one or more embodiments of the present invention.

For discussion purposes only, and not to be limiting thereof, the encryption data unit examples illustrated in FIGS. 2A and 2B are described in the context of the scenario in which User A's private key has not been compromised, but User B's private key has been compromised.

FIG. 2A is a block diagram illustrating a structure of an encrypted data unit including meta-data storing an encrypted symmetric key that can be used by and/or produced from one or more embodiments of the present invention. $EDU_A$ is associated with User A and comprises meta-data 212 and content data 214 which in this example includes a document. The meta-data 212 includes an encrypted symmetric key 216 which User A's private key 104 can decrypt.

FIG. 2B is a block diagram illustrating a structure of an encrypted data unit associated with a compromised private key including meta-data storing an example of an encrypted compromised private key chain data structure that can be used in one or more embodiments of the present invention. $EDU_B$ is associated with User B and comprises meta-data 202 and content data 204 which in this example includes a document. The meta-data 202 includes an encrypted symmetric key 206 which an unencrypted version of User B's compromised private key can decrypt and an encrypted compromised private key chain data structure 205 including an encrypted version 208 of the compromised User B private key and a reference 218. In this example, the reference 218 points to NULL as there is no predecessor encrypted compromised private key stored in the key chain. If there were, the reference would point to the storage location for the predecessor key.

Figure 3:
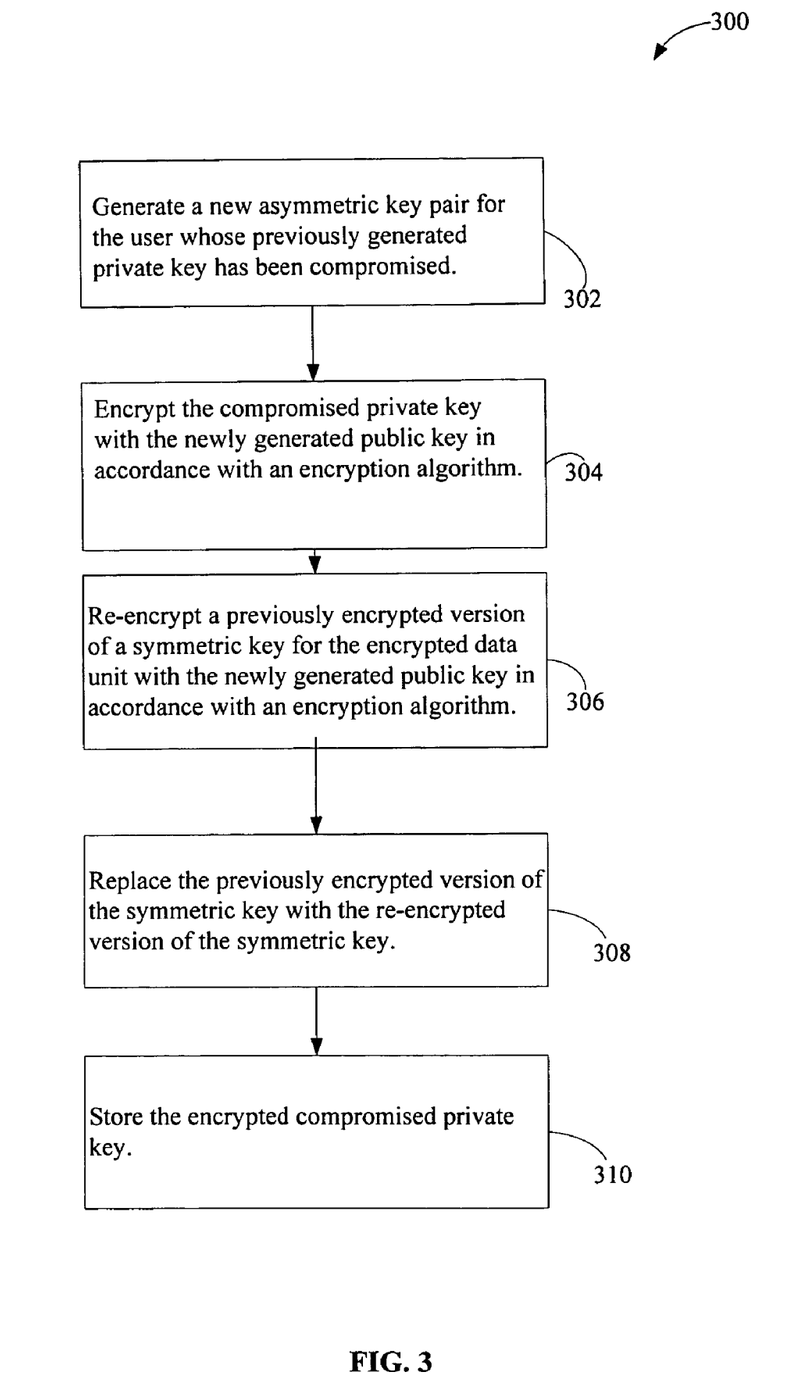
FIG. 3 is a flow diagram of a computer-implemented method for maintaining security of an encrypted data unit despite a compromised private key in accordance with another embodiment of the present invention.

FIG. 3 is a flow diagram of a computer-implemented method 300 for maintaining security of an encrypted data unit despite a compromised private key in accordance with another embodiment of the present invention. For illustrative purposes only and not to be limiting thereof, the method embodiment 300 of FIG. 3 is discussed in the context of the system embodiment 100 of FIG. 1. The asymmetric key pair generator 108 generates 302 a new asymmetric key pair for the user (e.g., User B asymmetric pair 136) whose previously generated private key has been compromised. The encryption module 124 encrypts 304 the compromised private key with the newly generated public key in accordance with an encryption algorithm, E(Public key$_{new}$, Private Key$_{old}$)=>Encrypted Private Key$_{old}$. The re-encryption module 125 re-encrypts 306 a previously encrypted version of a symmetric key for the encrypted data unit with the newly generated public key in accordance with an encryption algorithm, E(Public key$_{new}$, Encrypted Symmetric Key$_{old}$)=>Re-Encrypted Symmetric Key$_{old}$. Furthermore, the re-encryption module 125 replaces 308 the previously encrypted version of the symmetric key with the re-encrypted version of the symmetric key. The re-encryption module 125 also stores 310 the encrypted compromised private key. For example, the re-encryption module 125 adds the encrypted compromised private key to an encrypted compromised private key chain data structure in meta-data associated with the encrypted data unit.

Figure 4:
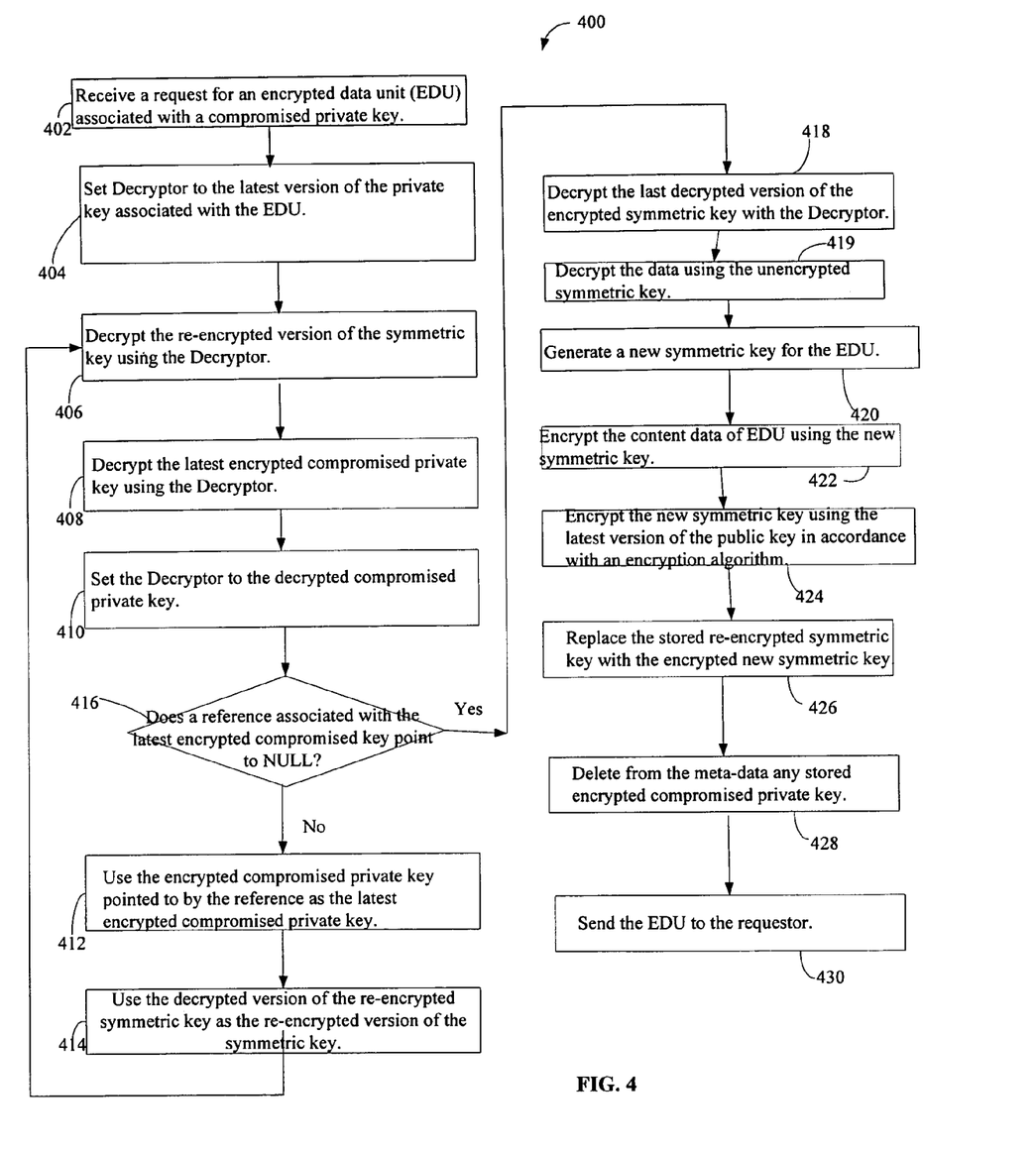
FIG. 4 is a flow diagram of a computer-implemented method for decrypting an encrypted data unit wherein the security of the encrypted data has been maintained despite a compromised private key in accordance with another embodiment of the present invention.
Figure 5:
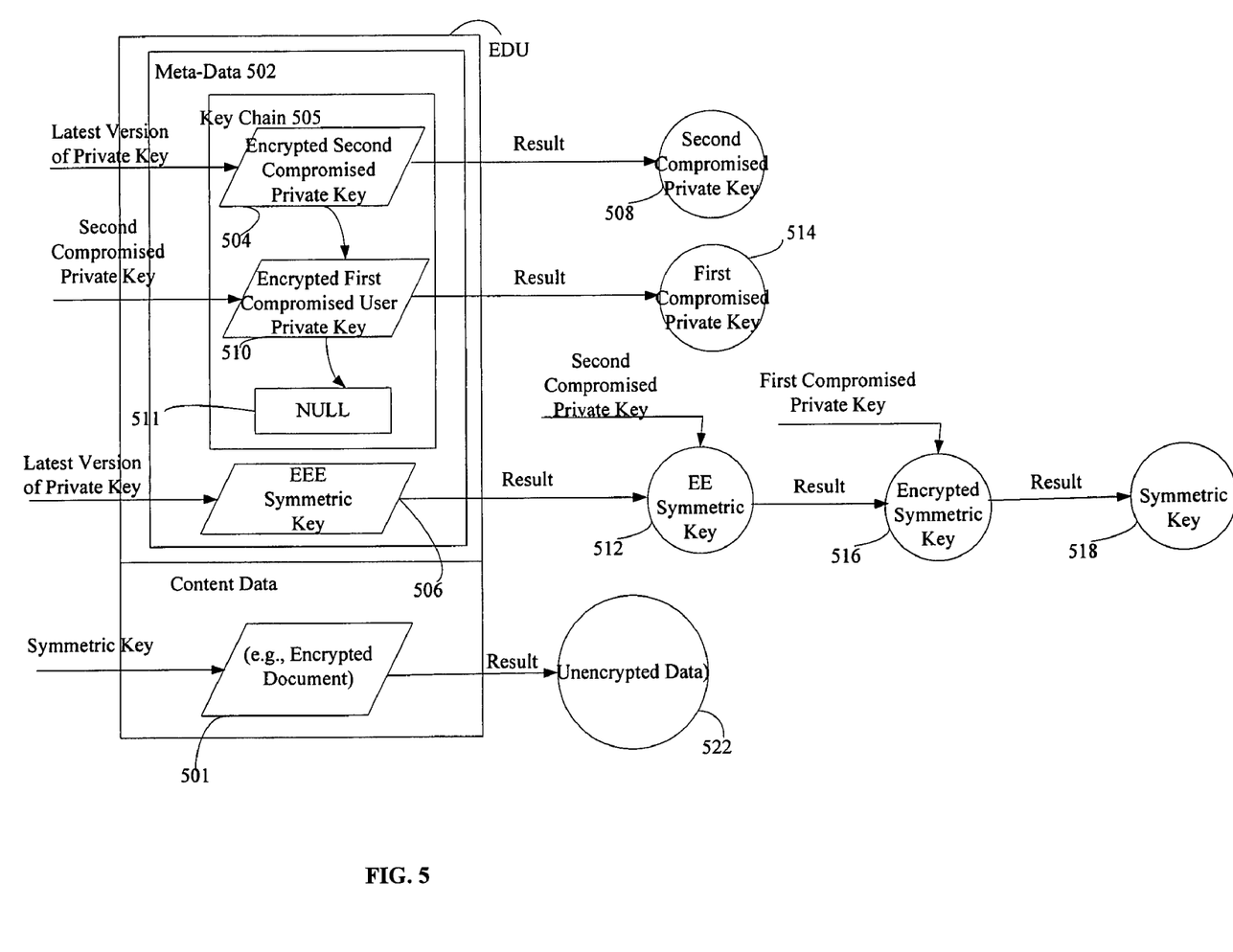
FIG. 5 is a data flow diagram illustrating the traversal of an encrypted compromised private key chain data structure and resulting keys from application of the method embodiment of FIG. 4 in an example involving two compromised private keys.

FIG. 4 is a flow diagram of a computer-implemented method 400 for decrypting encrypted data wherein the security of the encrypted data has been maintained despite a compromised private key in accordance with another embodiment of the present invention. FIG. 5 is a data flow diagram illustrating the traversal of an encrypted compromised private key chain data structure and resulting keys from application of the method embodiment of FIG. 4 in an example involving two compromised private keys. For illustrative purposes only and not to be limiting thereof, the method embodiment 400 of FIG. 4 is discussed in the context of the system embodiment 100 of FIG. 1 and with reference to FIG. 5 for illustration.

The example of an encrypted compromised private key chain data structure being traversed in FIG. 5 is implemented as a linked list including an encrypted second compromised private key 504 pointing to an encrypted first compromised private key 510 which points to NULL 511.

The encrypted data manager module 132 receives 402 a request for an encrypted data unit (e.g., EDU$_B$) associated with the compromised private key. As there may be more than one private key compromised for a data unit before a request or scheduled time update occurs, there may be more than one encrypted compromised private key in an encrypted compromised private key chain data structure as discussed for FIG. 5 above. The decryption module 126 sets 404 a variable named Decryptor for illustration to the latest version of the private key (e.g., 106) associated with the encrypted data unit and decrypts 406 the re-encrypted version of the symmetric key using the Decryptor. In the example of FIG. 5, the decryption module 126 decrypts with the latest version of the private key a version 506 of the symmetric key that has been encrypted three times resulting in a twice encrypted version 512 of the symmetric key. The decryption module 126 also decrypts 408 the latest encrypted private key using the Decryptor. In FIG. 5, decrypting the encrypted second compromised private key 504 with the latest version of the private key results in the Second Compromised Private Key 508. The decryption module 126 sets the Decryptor to the decrypted compromised private key. As illustrated in FIG. 5, the second compromised private key 508 can now be used to decrypt another set of an encrypted symmetric key 512 and an encrypted first compromised private key 510. Responsive to a reference associated with the latest encrypted compromised key not pointing 416 to NULL, the decryption module 126 uses 412 the encrypted compromised private key pointed to by the reference as the latest encrypted compromised private key, and uses 414 the decrypted version of the re-encrypted symmetric key as the re-encrypted version of the symmetric key. The decryption module 126 decrypts 406 the next encrypted symmetric key represented by the re-encrypted version of the symmetric key using the decrypted compromised private key represented by Decryptor. For example, in FIG. 5, the second compromised private key 508 decrypts the twice encrypted symmetric key 512 resulting in the encrypted version 516 of the symmetric key which the first compromised private key 514 can decrypt. The decryption module 126 also decrypts 408 the next encrypted compromised private key using the decrypted private compromised key represented by Decryptor. For example, in FIG. 5, the second compromised private key 508 decrypts the encrypted first compromised private key 510 resulting in the first compromised private key 514. The decryption module 126 sets 410 the Decryptor to this decrypted compromised private key (e.g., the first compromised private key 514).

Responsive to the reference pointing 416 to NULL indicating that there are no more encrypted compromised private keys in the chain, the decryption module 126 decrypts 418 the last decrypted version of the encrypted symmetric key with the Decryptor. In FIG. 5, the decryption module 126 uses the first compromised private key 514 to decrypt the encrypted symmetric key 516 in accordance with a decryption algorithm. The decryption module 126 decrypts 419 the data using the unencrypted symmetric key. In FIG. 5, the decryption module 126 uses the symmetric key 518 to decrypt the encrypted content data 501 resulting in the unencrypted data 522 of the encrypted data unit. The encryption module 124 generates 420 a new symmetric key for the encrypted data unit and encrypts 422 its content data using the new symmetric key. The encryption module 124 encrypts 424 the new symmetric key using the latest version of the public key in accordance with an encryption algorithm, replaces 426 the stored re-encrypted version of the symmetric key with the encrypted new symmetric key, and deletes 428 from the meta-data any stored encrypted compromised private key. The encrypted data manager module 132 sends 430 the EDU to the requestor.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the hereto appended claims. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A computer-implemented method for maintaining security of encrypted data despite a compromised private key comprising:

re-encrypting a previously encrypted version of a symmetric key using a public key of a new asymmetric key pair wherein an unencrypted version of the symmetric key can decrypt an encrypted data unit; and storing the re-encrypted version of the symmetric key, and a version of the compromised private key encrypted using the public key wherein an unencrypted version of the compromised private key is capable of decrypting the previously encrypted version of the symmetric key.

2. The method of claim 1 further comprising:
encrypting the compromised private key using the public key of the asymmetric key pair.

3. The method of claim 1 further comprising:
generating the new asymmetric key pair including the public key.

4. The method of claim 1 further comprising:
(a) responsive to a request for a decrypted version of the encrypted data unit associated with the compromised private key, decrypting the encrypted compromised private key using a private key of the new asymmetric pair resulting in the compromised private key;
(b) decrypting the re-encrypted symmetric key using a private key of the new asymmetric pair resulting in the previously encrypted version of the symmetric key;
(c) decrypting the previously encrypted version of the symmetric key using the compromised private key resulting in a resultant symmetric key; and
(d) responsive to the resultant symmetric key being the unencrypted version of the symmetric key, decrypting content data of the encrypted data unit using the unencrypted version of the symmetric key.

5. The method of claim 4 further comprising:
(e) responsive to the resultant symmetric key being another encrypted version of the symmetric key and there being stored in an encrypted compromised private key chain data structure in meta-data for the encrypted data unit another encrypted compromised private key, repeating acts (a), (b), (c), (d) and (e) using the decrypted compromised key as the private key of the asymmetric pair, using the other encrypted compromised private key as the encrypted compromised private key; and the resultant symmetric key as the re-encrypted symmetric key.

6. The method of claim 4 further comprising:
generating a new symmetric key;
encrypting the content data using the new symmetric key;
encrypting the new symmetric key using the public key;
replacing the stored re-encrypted symmetric key with the new symmetric key encrypted with the public key in the meta-data for the encrypted data unit; and
deleting from the meta-data any stored encrypted compromised private key.

7. A computer-implemented method for decrypting encrypted data wherein security of the encrypted data has been maintained despite the compromised private key, the method comprising:
(a) responsive to a request for a decrypted version of an encrypted data unit associated with the compromised private key, decrypting an encrypted version of the compromised private key using a private key of a new asymmetric pair resulting in the compromised private key;
(b) decrypting a re-encrypted symmetric key using the private key of the new asymmetric pair resulting in a previously encrypted version of the symmetric key;
(c) decrypting the previously encrypted version of the symmetric key using the compromised private key resulting in a resultant symmetric key; and
(d) responsive to the resultant symmetric key being an unencrypted version of the symmetric key, decrypting content data of the encrypted data unit using the unencrypted version of the symmetric key.

8. The method of claim 7 further comprising:
(e) responsive to the resultant symmetric key being another encrypted version of the symmetric key and there being stored in a compromised private key chain data structure in the meta-data for this encrypted data unit another encrypted compromised private key, repeating acts (a), (b), (c), (d) and (e) using the private key of the new asymmetric pair as the decrypted compromised key, using the encrypted compromised private key as the other encrypted compromised private key; and using the resultant symmetric key as the re-encrypted symmetric key.

9. The method of claim 7 further comprising:
generating a new symmetric key;
encrypting the content data using the new symmetric key;
encrypting the new symmetric key using the public key;
replacing the stored re-encrypted symmetric key with the new symmetric key encrypted with the public key in the meta-data for the encrypted data unit; and
deleting from the meta-data any stored encrypted compromised private key.

10. A computer-implemented system for maintaining security of encrypted data despite a compromised private key comprising:
a re-encryption module for re-encrypting a previously encrypted version of a symmetric key using a public key of a new asymmetric key pair wherein an unencrypted version of the symmetric key can decrypt an encrypted data unit; and
a data-store accessible to the re-encryption module for storing the re-encrypted version of the symmetric key, and a version of the compromised private key encrypted using the public key wherein an unencrypted version of the compromised private key is capable of decrypting the previously encrypted version of the symmetric key.

11. The system of claim 10 further comprising:
an encryption module for encrypting the compromised private key using the public key of the asymmetric key pair communicatively coupled to the re-encryption module.

12. The system of claim 10 further comprising:
an asymmetric pair generator module for generating the new asymmetric key pair including the public key.

13. The system of claim 10 further comprising a decryption module communicatively coupled to the encryption module for performing the following:
(a) responsive to a request for a decrypted version of the encrypted data unit associated with the compromised private key, decrypting the encrypted compromised private key using a private key of the new asymmetric pair resulting in the compromised private key;
(b) decrypting the re-encrypted symmetric key using a private key of the new asymmetric pair resulting in the previously encrypted version of the symmetric key;
(c) decrypting the previously encrypted version of the symmetric key using the compromised private key resulting in a resultant symmetric key; and
(d) responsive to the resultant symmetric key being the unencrypted version of the symmetric key, decrypting content data of the encrypted data unit using the unencrypted version of the symmetric key.

14. The system of claim 13 wherein the decryption module further performs:

(e) responsive to the resultant symmetric key being another encrypted version of the symmetric key and there being stored in an encrypted compromised private key chain data structure in meta-data for the encrypted data unit another encrypted compromised private key, repeating acts (a), (b), (c), (d) and (e) using the decrypted compromised key as the private key of the asymmetric pair, using the other encrypted compromised private key as the encrypted compromised private key; and the resultant symmetric key as the re-encrypted symmetric key.

15. The system of claim 13 wherein the encryption module further performs:
   generating a new symmetric key;
   encrypting the content data using the new symmetric key;
   encrypting the new symmetric key using the public key;
   replacing the stored re-encrypted symmetric key with the new symmetric key encrypted with the public key in the meta-data for the encrypted data unit; and
   deleting from the meta-data any stored encrypted compromised private key.

16. A computer-implemented system for decrypting encrypted data wherein security of the encrypted data has been maintained despite the compromised private key, the system comprising a decryption module for performing the following:
   (a) responsive to a request for a decrypted version of an encrypted data unit associated with the compromised private key, decrypting an encrypted version of the compromised private key using a private key of a new asymmetric pair resulting in the compromised private key;
   (b) decrypting a re-encrypted symmetric key using the private key of the new asymmetric pair resulting in a previously encrypted version of the symmetric key;
   (c) decrypting the previously encrypted version of the symmetric key using the compromised private key resulting in a resultant symmetric key; and
   (d) responsive to the resultant symmetric key being an unencrypted version of the symmetric key, decrypting content data of the encrypted data unit using the unencrypted version of the symmetric key.

17. The system of claim 16 wherein the decryption module further performs:
   (e) responsive to the resultant symmetric key being another encrypted version of the symmetric key and there being stored in a compromised private key chain data structure in the meta-data for this encrypted data unit another encrypted compromised private key, repeating acts (a), (b), (c), (d) and (e) using the private key of the new asymmetric pair as the decrypted compromised key, using the encrypted compromised private key as the other encrypted compromised private key; and using the resultant symmetric key as the re-encrypted symmetric key.

18. The system of claim 16 further comprising an encryption module for performing:
   generating a new symmetric key;
   encrypting the content data using the new symmetric key;
   encrypting the new symmetric key using the public key;
   replacing the stored re-encrypted symmetric key with the new symmetric key encrypted with the public key in the meta-data for the encrypted data unit; and
   deleting from the meta-data any stored encrypted compromised private key.

19. A computer usable medium comprising instructions for causing a processor to execute a method for maintaining security of encrypted data despite a compromised private key, the method comprising:
   re-encrypting a previously encrypted version of a symmetric key using a public key of a new asymmetric key pair wherein an unencrypted version of the symmetric key can decrypt an encrypted data unit; and
   storing the re-encrypted version of the symmetric key, the, and a version of the compromised private key encrypted using the public key wherein an unencrypted version of the compromised private key is capable of decrypting the previously encrypted version of the symmetric key.

20. The computer usable medium of claim 19 wherein the method further comprises:
   encrypting the compromised private key using the public key of the asymmetric key pair.

21. The computer usable medium of claim 19 wherein the method further comprises:
   generating the new asymmetric key pair including the public key.

22. A computer usable medium comprising instructions for causing a processor to execute a method for decrypting encrypted data wherein security of the encrypted data has been maintained despite the compromised private key, the method comprising:
   (a) responsive to a request for a decrypted version of an encrypted data unit associated with the compromised private key, decrypting an encrypted version of the compromised private key using a private key of a new asymmetric pair resulting in the compromised private key;
   (b) decrypting a re-encrypted symmetric key using the private key of the new asymmetric pair resulting in a previously encrypted version of the symmetric key;
   (c) decrypting the previously encrypted version of the symmetric key using the compromised private key resulting in a resultant symmetric key; and
   (d) responsive to the resultant symmetric key being an unencrypted version of the symmetric key, decrypting content data of the encrypted data unit using the unencrypted version of the symmetric key.

23. The computer usable medium of claim 22 further comprising:
   (e) responsive to the resultant symmetric key being another encrypted version of the symmetric key and there being stored in a compromised private key chain data structure in the meta-data for this encrypted data unit another encrypted compromised private key, repeating acts (a), (b), (c), (d) and (e) using the private key of the new asymmetric pair as the decrypted compromised key, using the encrypted compromised private key as the other encrypted compromised private key; and using the resultant symmetric key as the re-encrypted symmetric key.

24. The computer usable medium of claim 22 further comprising:
   generating a new symmetric key;
   encrypting the content data using the new symmetric key;
   encrypting the new symmetric key using the public key;
   replacing the stored re-encrypted symmetric key with the new symmetric key encrypted with the public key in the meta-data for the encrypted data unit; and
   deleting from the meta-data any stored encrypted compromised private key.

25. A computer-implemented system for maintaining security of encrypted data despite a compromised private key comprising:
   means for re-encrypting a previously encrypted version of a symmetric key using a public key of a new asymmetric key pair wherein an unencrypted version of the symmetric key can decrypt an encrypted data unit; and a data-store accessible to the means for re-encrypting for storing the re-encrypted version of the symmetric key, and a version of the compromised private key encrypted using the public key wherein an unencrypted version of the compromised private key is capable of decrypting the previously encrypted version of the symmetric key.

26. The system of claim 25 further comprising:
means for encrypting the compromised private key using the public key of the asymmetric key pair communicatively coupled to the re-encryption module.

27. The system of claim 25 further comprising:
means for generating the new asymmetric key pair including the public key.

28. A computer-implemented system for decrypting encrypted data wherein security of the encrypted data has been maintained despite the compromised private key, the system comprising means for decryption for performing the following:
(a) responsive to a request for a decrypted version of an encrypted data unit associated with the compromised private key, decrypting an encrypted version of the compromised private key using a private key of a new asymmetric pair resulting in the compromised private key;
(b) decrypting a re-encrypted symmetric key using the private key of the new asymmetric pair resulting in a previously encrypted version of the symmetric key;
(c) decrypting the previously encrypted version of the symmetric key using the compromised private key resulting in a resultant symmetric key; and
(d) responsive to the resultant symmetric key being an unencrypted version of the symmetric key, decrypting content data of the encrypted data unit using the unencrypted version of the symmetric key.

29. The system of claim 28 wherein the means for decryption further performs:
(e) responsive to the resultant symmetric key being another encrypted version of the symmetric key and there being stored in a compromised private key chain data structure in the meta-data for this encrypted data unit another encrypted compromised private key, repeating acts (a), (b), (c), (d) and (e) using the private key of the new asymmetric pair as the decrypted compromised key, using the encrypted compromised private key as the other encrypted compromised private key; and using the resultant symmetric key as the re-encrypted symmetric key.

30. The system of claim 28 further comprising means for encryption for performing:
generating a new symmetric key;
encrypting the content data using the new symmetric key;
encrypting the new symmetric key using the public key;
replacing the stored re-encrypted symmetric key with the new symmetric key encrypted with the public key in the meta-data for the encrypted data unit; and
deleting from the meta-data any stored encrypted compromised private key.

* * * * *

UNITED STATES PATENT AND TRADEMARK OFFICE
CERTIFICATE OF CORRECTION

PATENT NO.          : 7,454,021 B2
APPLICATION NO. : 10/976552
DATED                  : November 18, 2008
INVENTOR(S)        : Prakash Reddy et al.

It is certified that error appears in the above-identified patent and that said Letters Patent is hereby corrected as shown below:

In column 3, line 59, delete "10," and insert -- 110, --, therefor.

Signed and Sealed this

Twenty-fifth Day of August, 2009

David J. Kappos
*Director of the United States Patent and Trademark Office*